(12) United States Patent
Yoshida et al.

(10) Patent No.: US 10,994,786 B2
(45) Date of Patent: May 4, 2021

(54) STRUCTURE FOR FRONT PART OF VEHICLE

(71) Applicants: KOBE STEEL, LTD., Hyogo (JP); MAZDA MOTOR CORPORATION, Hiroshima (JP)

(72) Inventors: Masatoshi Yoshida, Kobe (JP); Tadashi Yamazaki, Hiroshima (JP); Ryotaro Hirata, Higashihiroshima (JP)

(73) Assignees: KOBE STEEL, LTD., Hyogo (JP); MAZDA MOTOR CORPORATION, Hiroshima (JP)

(*) Notice: Subject to any disclaimer, the term of this patent is extended or adjusted under 35 U.S.C. 154(b) by 57 days.

(21) Appl. No.: 16/495,788

(22) PCT Filed: Mar. 9, 2018

(86) PCT No.: PCT/JP2018/009321
§ 371 (c)(1),
(2) Date: Sep. 19, 2019

(87) PCT Pub. No.: WO2018/180382
PCT Pub. Date: Oct. 4, 2018

(65) Prior Publication Data
US 2020/0023907 A1 Jan. 23, 2020

(30) Foreign Application Priority Data
Mar. 29, 2017 (JP) .............................. JP2017-064980

(51) Int. Cl.
*B62D 25/08* (2006.01)
*B62D 25/14* (2006.01)
(Continued)

(52) U.S. Cl.
CPC ......... *B62D 25/081* (2013.01); *B62D 25/082* (2013.01); *B62D 25/088* (2013.01);
(Continued)

(58) Field of Classification Search
CPC .. B62D 25/081; B62D 25/082; B62D 25/088; B62D 25/14; B62D 21/155; B62D 27/023; B62D 65/00
(Continued)

(56) References Cited

U.S. PATENT DOCUMENTS 9,193,390 B1* 11/2015 Yoshida ............... B62D 29/008
9,216,769 B2* 12/2015 Hong .................. B62D 25/082
(Continued)

FOREIGN PATENT DOCUMENTS

| JP | 2013-166424 A | 8/2013 |
|---|---|---|
| JP | 2014-019165 A | 2/2014 |
| JP | 2016-190633 A | 11/2016 |

*Primary Examiner* — Pinel E Romain
(74) *Attorney, Agent, or Firm* — Studebaker & Brackett PC

(57) ABSTRACT

Provided is a structure for a front part of a vehicle, including a vehicle main body, a pair of suspension support portions, and a cowl member connected to the pair of suspension support portions. The cowl member has: an inner part connection portion which has a shape extending continuously in a vehicle width direction between the pair of suspension support portions and which interconnects respective inner parts of the pair of suspension support portions in the vehicle width direction; and a water drain portion which is provided backward of the inner part connection portion in a front-rear direction of the vehicle and drains water toward a side part of the vehicle in the vehicle width direction. The inner part connection portion has a thickness larger than a thickness of the water drain portion.

4 Claims, 6 Drawing Sheets

(51) Int. Cl.
*B62D 21/15* (2006.01)
*B62D 27/02* (2006.01)
*B62D 65/00* (2006.01)

(52) U.S. Cl.
CPC ............ *B62D 25/14* (2013.01); *B62D 21/155* (2013.01); *B62D 27/023* (2013.01); *B62D 65/00* (2013.01)

(58) Field of Classification Search
USPC ........................................................ 296/192
See application file for complete search history.

(56) References Cited

U.S. PATENT DOCUMENTS

| | | | |
|---|---|---|---|
| 9,981,697 B2* | 5/2018 | Nakashima | B60J 10/45 |
| 2006/0087155 A1* | 4/2006 | Koyama | B62D 25/081 |
| | | | 296/192 |
| 2009/0146459 A1* | 6/2009 | Watanabe | B60H 1/28 |
| | | | 296/192 |
| 2010/0187862 A1* | 7/2010 | Kurata | B60R 13/04 |
| | | | 296/192 |
| 2014/0049073 A1* | 2/2014 | Kawachi | B62D 25/081 |
| | | | 296/193.09 |
| 2014/0367994 A1* | 12/2014 | Sasaki | B62D 25/08 |
| | | | 296/187.09 |
| 2016/0288839 A1 | 10/2016 | Fukuoka | |

* cited by examiner ns between the windshield and the hood from above the vehicle. Many of cowl members are therefore set to have a shape opened upward and extending in a vehicle width direction. The cowl member is also required to have a function of improving rigidity (torsion rigidity and bending rigidity) of a vehicle main body during travelling of a vehicle. Specifically, since a load in an up-down direction is input from right and left tires to suspensions provided on both sides of the vehicle main body in the vehicle width direction and to a pair of suspension support portions which support these suspensions, the cowl member is generally connected to the pair of suspension support portions. This improves rigidity of the vehicle main body.

For example, Patent Literature 1 discloses a structure for a front part of a vehicle including a pair of suspension towers (suspension support portions) provided in a vehicle main body and a front cowl member connected to the pair of suspension towers. The front cowl member has a front flange portion connected to each suspension tower, a vertical wall portion extending downward from a rear end portion of the front flange portion, and a rear flange portion extending rearward from a lower end portion of the vertical wall portion. The vertical wall portion and the rear flange portion have a shape opened upward and also extending in the vehicle width direction. In other words, the vertical wall portion and the rear flange portion have a function as a water drain portion provided backward of the front flange portion to drain rainwater or the like to the outside of the vehicle. Each end portion of the front flange portion in a vehicle width direction is provided with a bolt hole, and the front flange portion is connected to a rear part of the suspension tower by a bolt. In the front cowl member, the front flange portion is set to have a thickness larger than a thickness of the water drain portion (the vertical wall portion and the rear flange portion). Therefore, in the front cowl member disclosed in Patent Literature 1, rigidity of the vehicle main body against a load in an up-down direction which is input to each suspension tower is ensured while achieving weight reduction of the front cowl member as a whole, as compared with a case where the front flange portion and the water drain portion are set to have the same thickness.

Since such a cowl member as disclosed in Patent Literature 1 needs to be connected to each suspension support portion for ensuring rigidity of the vehicle main body, and the water drain portion of the cowl member needs to be provided backward of a part of the cowl member, the part being connected to each suspension support portion, and be provided forward of a windshield, arrangement of each suspension support portion relative to the vehicle main body in a front-rear direction of the vehicle is restricted. In other words, reduction in a gap in the front-rear direction of the vehicle between each suspension support portion and the windshield is restricted.

CITATION LIST

Patent Literature

Patent Literature 1: JP 2013-166424 A

SUMMARY OF INVENTION

An object of the present invention is to provide a structure for a front part of a vehicle which structure enables restrictions on arrangement of each suspension support portion relative to a vehicle main body in a front-rear direction of a vehicle to be relieved while ensuring rigidity of the vehicle main body.

A structure for a front part of a vehicle according to one aspect of the present invention includes: a vehicle main body; a pair of suspension support portions provided to be spaced in a vehicle width direction of the vehicle main body and each supporting a suspension; and a cowl member connected to the pair of suspension support portions. The cowl member has: an inner part connection portion which has a shape extending continuously in the vehicle width direction between the pair of suspension support portions and which interconnects respective inner parts of the pair of suspension support portions in the vehicle width direction; and a water drain portion which is provided backward of the inner part connection portion in a front-rear direction of the vehicle and drains water toward a side part of the vehicle in the vehicle width direction. The inner part connection portion has a thickness larger than a thickness of the water drain portion.

DESCRIPTION OF EMBODIMENTS

A structure for a front part of a vehicle according to one embodiment of the present invention will be described with reference to FIG. 1 to FIG. 6.

Figure 1:
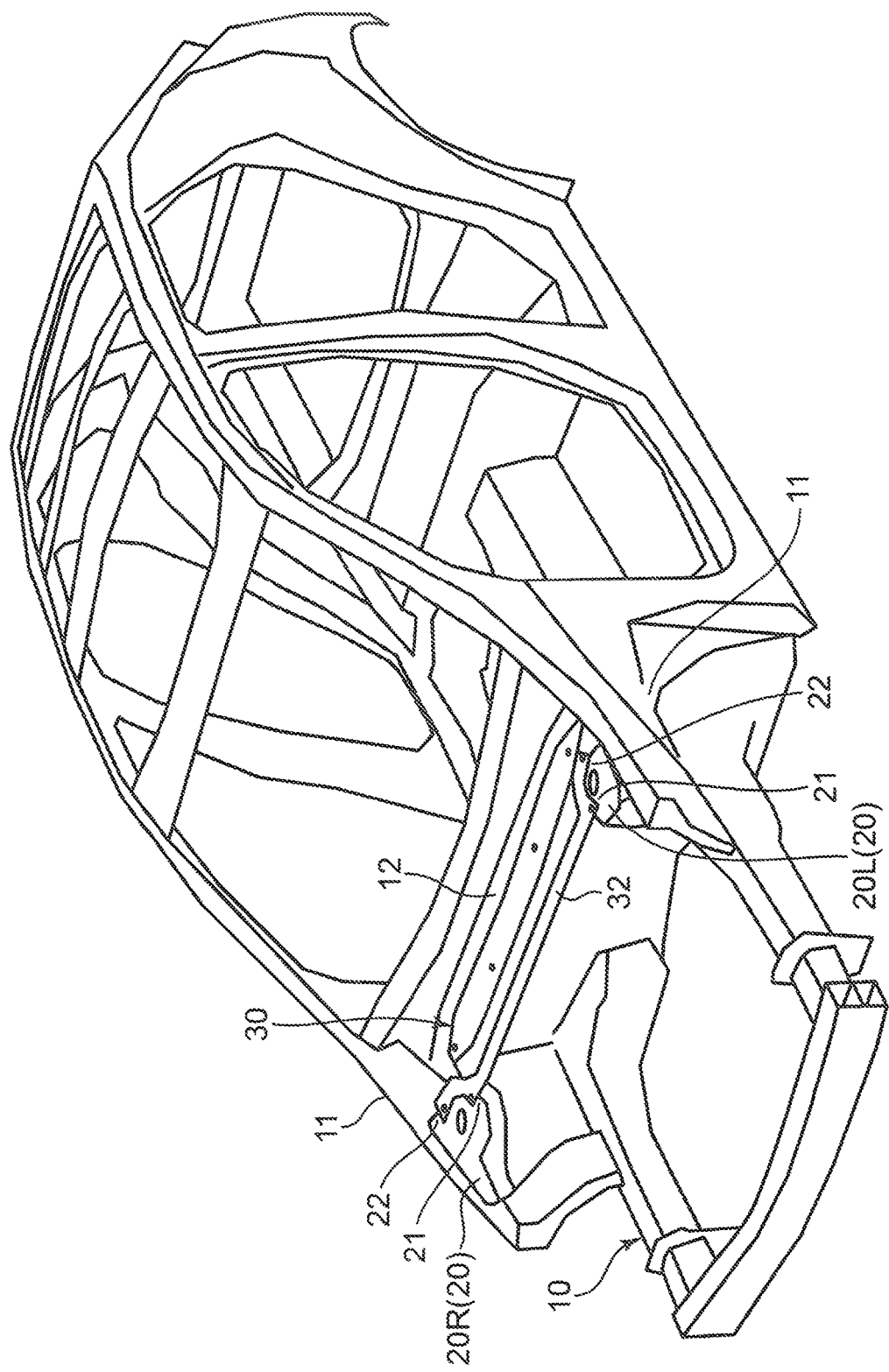
FIG. 1 is a schematic view of a frame of a vehicle including a structure for a front part of the vehicle according to one embodiment of the present invention.

As shown in FIG. 1, the present structure for a front part of a vehicle includes a vehicle main body 10, a pair of suspension support portions (suspension towers) 20 each supporting a suspension (not shown), and a cowl member 30.

Figure 2:
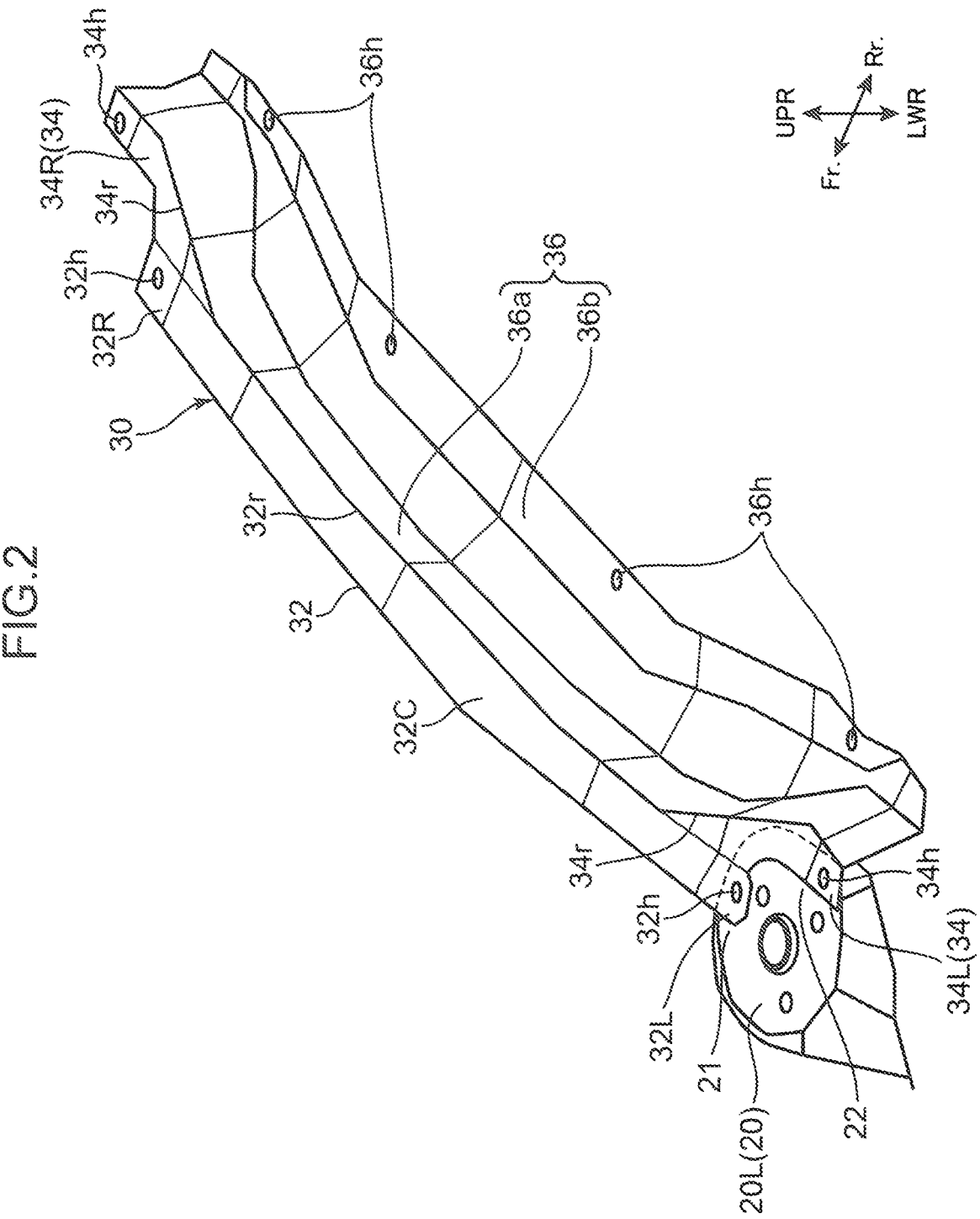
FIG. 2 is a perspective view of a cowl member and a suspension support portion shown in FIG. 1.

The pair of suspension support portions 20 is provided in a front part of a vehicle cabin of the vehicle main body 10 and at positions spaced apart from each other in a vehicle width direction. Specifically, the pair of suspension support portions 20 has a right suspension support portion 20R which supports the suspension provided at a right-side side part of the vehicle main body 10 in the vehicle width direction and a left suspension support portion 20L which supports the suspension provided at a left-side side part of the vehicle main body 10 in the vehicle width direction. As shown in FIG. 1, each of the suspension support portions 20R and 20L is arranged at an inner side of a fender 11 of the vehicle main body 10 in the vehicle width direction. During travelling of the vehicle, a load in the up-down direction is input to each of the suspension support portions 20R and 20L from a tire. In FIG. 2, illustration of the right suspension support portion 20R is omitted.

The cowl member 30 is connected to the pair of suspension support portions 20. The cowl member 30 may be directly connected to the pair of suspension support portions 20 or connected to the pair of suspension support portions 20 via a bracket. The cowl member 30 has a function of draining rainwater or the like toward a outer side (the fender 11 side) of the vehicle in the vehicle width direction without allowing the rainwater or the like to enter an engine room, the rainwater or the like having entered through a gap between a hood 15 (see FIG. 4) and a windshield G (see FIG. 4), and a function of improving rigidity of the vehicle main body 10 (torsion rigidity, bending rigidity, or the like). The cowl member 30 needs strength to the degree of not being plastically deformed by a load input via the each suspension support portions 20R and 20L and is preferably made of any one of 5000 series, 6000 series and 7000 series aluminum alloys. The cowl member 30 is more preferably made of a 6000 series aluminum alloy which is excellent in particular in extrudability, corrosion resistance, and stress corrosion cracking resistance. In the present embodiment, the cowl member 30 has an inner part connection portion 32, a pair of protrusion portions 34, and a water drain portion 36.

The inner part connection portion 32 has a shape continuously extending in the vehicle width direction between the pair of suspension support portions 20 and interconnects respective inner side end portions (hereinafter, referred to as "inner part") 21 of the suspension support portions 20R and 20L in the vehicle width direction. Specifically, a right end portion 32R of the inner part connection portion 32 in the vehicle width direction is connected to the inner part 21 of the right suspension support portion 20R and a left end portion 32L of the inner part connection portion 32 in the vehicle width direction is connected to the inner part 21 of the left suspension support portion 20L. In the present embodiment, in the each end portions 32R and 32L of the inner part connection portion 32, a hole 32h is provided which allows insertion of a coupling device such as a bolt, and the inner part connection portion 32 is connected to the inner parts 21 of the each suspension support portions 20R and 20L by the coupling device. The inner part connection portion 32 may be linearly formed in parallel with the vehicle width direction or may be formed to have a curved shape which slightly protrudes toward the front side of the vehicle. The inner part connection portion 32 is more preferably formed linearly in parallel with the vehicle width direction. This arrangement increases a load transmission efficiency from the each suspension support portions 20R and 20L to the inner part connection portion 32, resulting in increasing rigidity of the parts.

Figure 5:
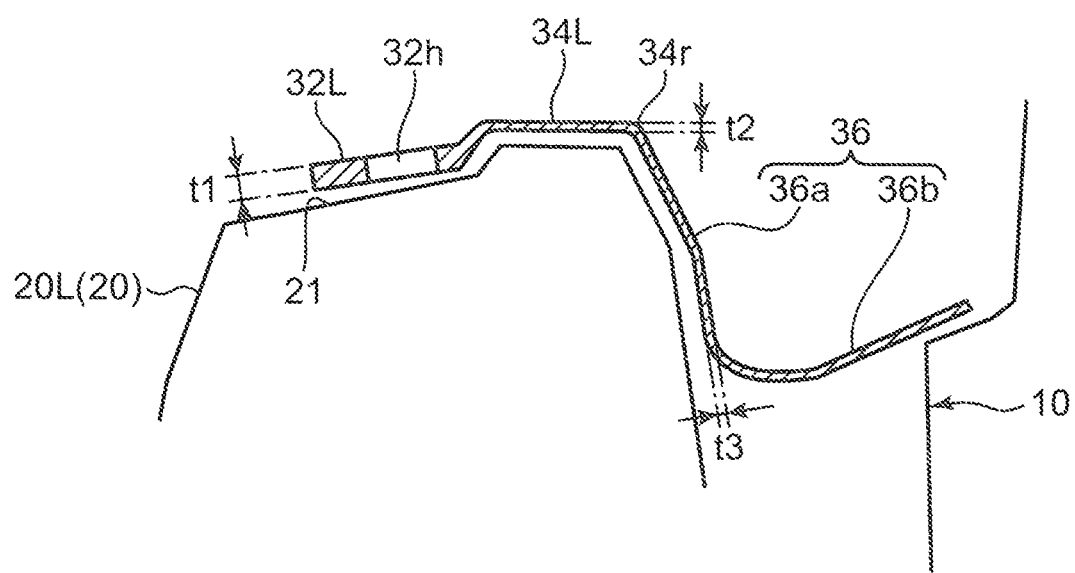
FIG. 5 is a view showing a cross-section taken along line V-V in FIG. 3 and its surroundings.
Figure 6:
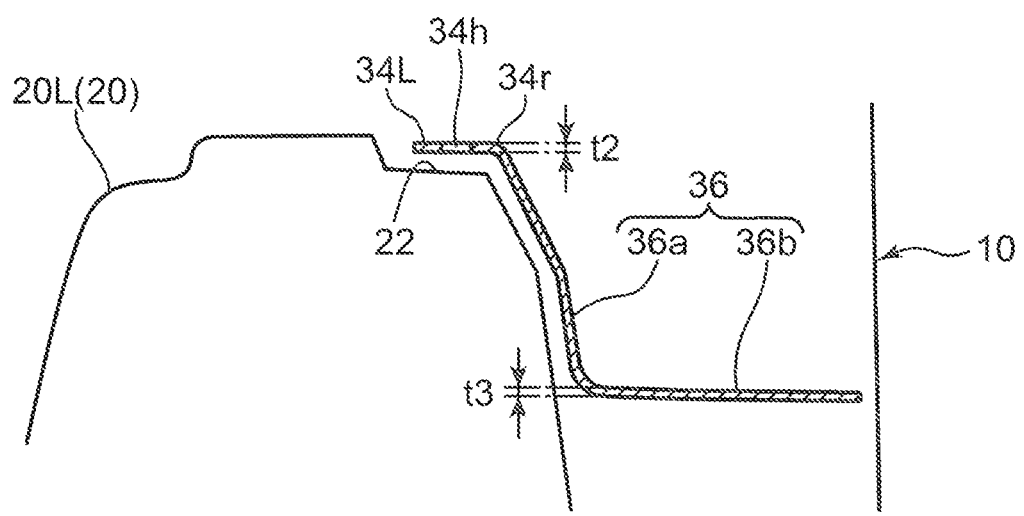
FIG. 6 is a view showing a cross-section taken along line VI-VI in FIG. 3 and its surroundings.

The pair of protrusion portions 34 have respective shapes protruding from the end portions 32R and 32L of the inner part connection portion 32 in the vehicle width direction toward the rear side in the front-rear direction of the vehicle and toward the outer side of the vehicle in the vehicle width direction. Specifically, the pair of protrusion portions 34 has a right protrusion portion 34R which protrudes backward right from the right end portion 32R of the inner part connection portion 32 and a left protrusion portion 34L which protrudes backward left from the left end portion 32L of the inner part connection portion 32. A outer side (the right side in FIG. 3) end portion of the right protrusion portion 34R in the vehicle width direction is connected to a rear part 22 of the right suspension support portion 20R and a outer side (side left side in FIG. 3) end portion of the left protrusion portion 34L in the vehicle width direction is connected to a rear part 22 of the left suspension support portion 20L. In the present embodiment, each outer side end portion of the protrusion portions 34R and 34L is provided with a hole 34h for allowing insertion of a coupling device such as a bolt, so that the protrusion portions 34R and 34L are connected to the rear parts 22 of the each suspension support portions 20R and 20L by the coupling device. As shown in FIG. 5, the pair of protrusion portions 34 has a thickness t2 smaller than a thickness t1 of the inner part connection portion 32.

The water drain portion 36 is provided backward of the inner part connection portion 32 in the front-rear direction of the vehicle. The water drain portion 36 drains rainwater or the like toward a side part (the fender 11) of the vehicle in the vehicle width direction. The water drain portion 36 has a vertical wall 36a and a bottom portion 36b.

Figure 3:
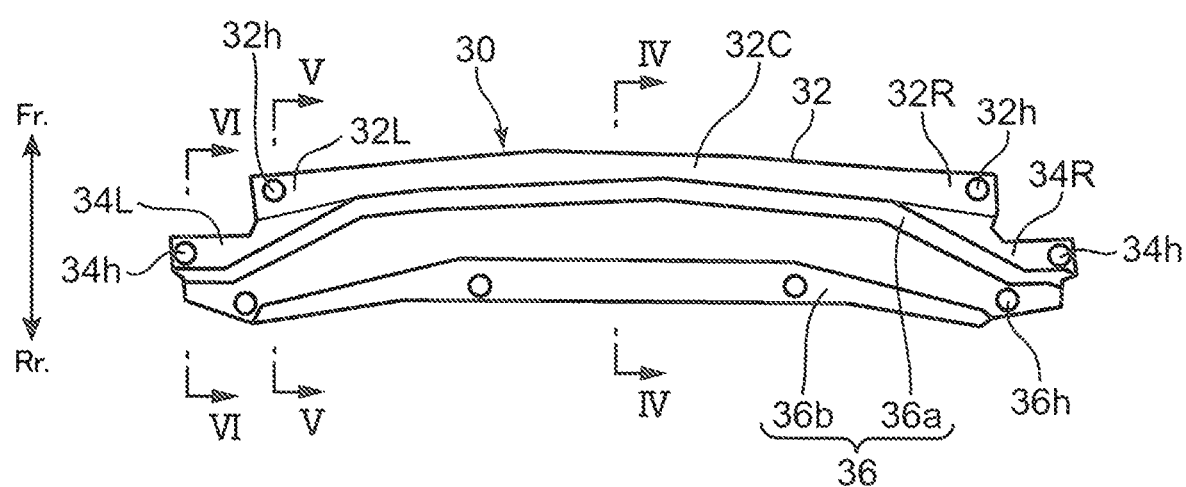
FIG. 3 is a plan view of the cowl member shown in FIG. 1.
Figure 4:
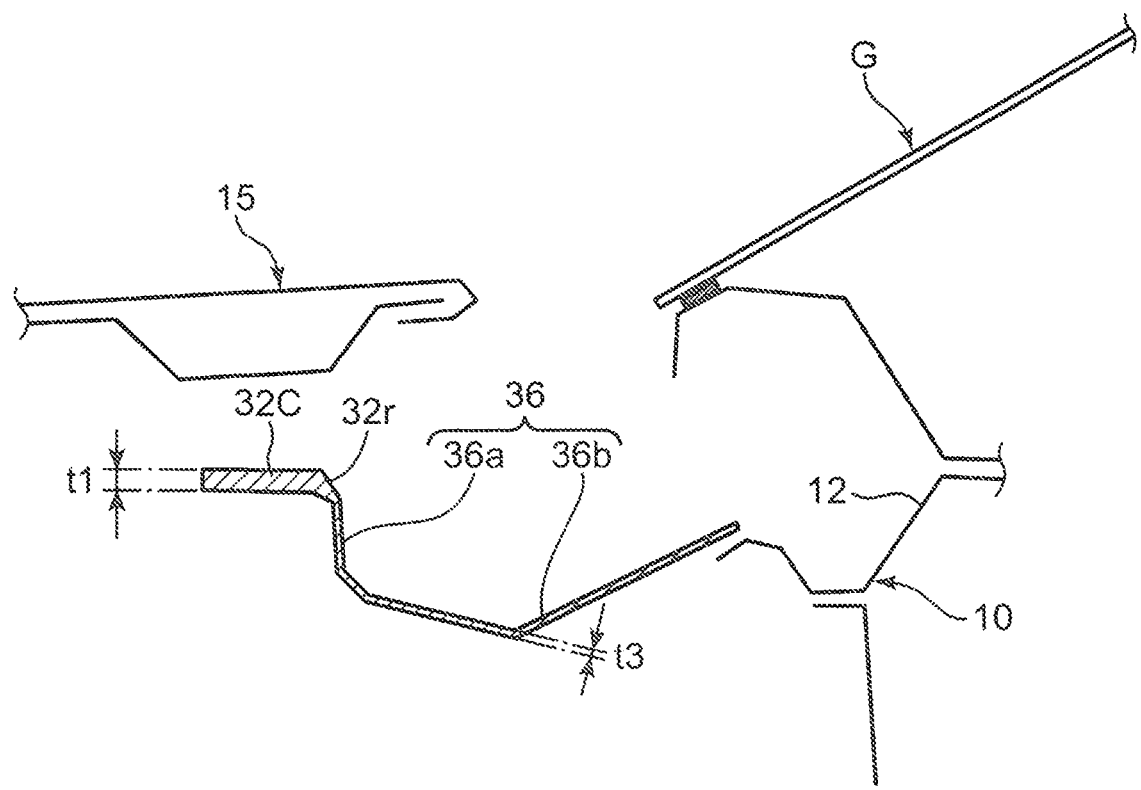
FIG. 4 is a view showing a cross-section taken along line IV-IV in FIG. 3 and its surroundings.

The vertical wall 36a has a shape extending downward from a rear side edge portion 32r (see FIG. 2 and FIG. 4) of the center portion 32C of the inner part connection portion 32 (a portion of the inner part connection portion 32, excluding both end portions 32R and 32L of the inner part connection portion 32) and from a rear side edge portion 34r (see FIG. 2, FIG. 5, and FIG. 6) of each of the protrusion portions 34R and 34L. The bottom portion 36b has a shape extending backward from a lower end portion of the vertical wall 36a and projecting downward. In other words, the water drain portion 36 has a shape opened upward and extending in the vehicle width direction. As shown in FIG. 2 and FIG. 3, the water drain portion 36 has a curved shape which protrudes to the front side of the vehicle such that a center portion of the water drain portion 36 in the vehicle width direction overlaps the pair of protrusion portions 34 in the vehicle width direction. As shown in FIG. 1, FIG. 4, and the like, a rear part of the bottom portion 36b is connected to the vehicle main body 10. In other words, the rear part of the bottom portion 36b configures a "rear connected portion". In the present embodiment, the rear connected portion is provided with a hole 36h for allowing insertion of a coupling device such as a bolt, and the rear connected portion is connected to the vehicle main body 10 (e.g. the cowl panel 12) by the coupling device. As shown in FIG. 4 and FIG. 5, the water drain portion 36 has a thickness t3 smaller than the thickness t1 of the inner part connection portion 32. In the present embodiment, the thickness t3 of the water drain portion 36 is set to be the same as the thickness t2 of the pair of protrusion portions 34. However, the thickness t3 of the water drain portion 36 may be set to be smaller than the thickness t2 of the pair of protrusion portions 34.

In the present embodiment, the cowl member 30 is produced by press-molding (draw molding) an extruded shape obtained by extrusion-molding of an aluminum alloy and then trimming and boring the resultant product. In the trimming, a part of the extruded shape after press-molding is cut out, the part being located at the outer side of the end portions 32R and 32L of the inner part connection portion 32 and located forward of the protrusion portions 34R and 34L. In the boring, each of the holes 32h, 34h, and 36h is formed.

As described in the foregoing, in the structure for a front part of a vehicle of the present embodiment, the inner part connection portion 32 (the part having the thickness larger than the thickness of the water drain portion 36) of the cowl member 30 connects, between the pair of suspension support portions 20, the inner parts 21 (parts located forward of the rear parts 22 of the each suspension support portions 20R and 20L) of the corresponding pair of suspension support portions 20. It is therefore possible to reduce a distance in the front-rear direction of the vehicle from the each suspension support portions 20R and 20L to a rear end portion of the cowl member 30 (to relieve restrictions on arrangement of the each suspension support portions 20R and 20L relative to the vehicle main body 10) while ensuring rigidity of the vehicle main body 10.

Also in the present embodiment, the pair of protrusion portions 34 having the thickness smaller than the thickness of the inner part connection portion 32 is connected to the rear parts 22 of the each suspension support portions 20R and 20L.

It is therefore possible to increase connection strength of the cowl member 30 with the each suspension support portions 20R and 20L and rigidity of the vehicle main body 10 while avoiding a striking increase in weight of the cowl member 30.

While the foregoing disclosed embodiment is in all aspects illustrative and not restrictive. The scope of the present invention is shown not by the above-description of the embodiment but by the scope of claims and further, includes meaning equivalent to the scope of claims and all modification within the scope.

For example, the thickness of the rear connected portion may be set to be larger than the thickness t3 of a part of the water drain portion 36 other than the rear connected portion. This arrangement enables an increase in connection strength of the cowl member 30 with the vehicle main body 10 while avoiding a striking increase in weight of the cowl member 30. Also, since in this mode, in the cowl member 30, the inner part connection portion 32 located in the front part will have a relatively large thickness t1 and the rear connected portion located in the rear part will have a relatively large thickness, i.e., a part far from a neutral axis will have a large thickness with respect to bending deformation in the front-rear direction of the vehicle, bending rigidity of the cowl member 30 will be effectively increased.

Additionally, the cowl member 30 may have a flange portion protruding forward from a front side edge portion of the inner part connection portion 32. In this case, the flange portion is preferably set to have a thickness smaller than the thickness of the inner part connection portion 32.

Also, the water drain portion 36 may have a shape which protrudes to the front side of the vehicle such that the center portion of the water drain portion 36 is located between the end portions 32R and 32L of the inner part connection portion 32 in the vehicle width direction. In this case, a part of the water drain portion 36, the part being located between the end portions 32R and 32L, is set to have the same thickness as the thickness t1 of the inner part connection portion 32.

Here, the above embodiment will be summarized.

The structure for a front part of a vehicle according to the above embodiment includes a vehicle main body; a pair of suspension support portions provided to be spaced in a vehicle width direction of the vehicle main body and each supporting a suspension; and a cowl member connected to the pair of suspension support portions. The cowl member has an inner part connection portion which has a shape extending continuously in the vehicle width direction between the pair of suspension support portions and which interconnects respective inner parts of the pair of suspension support portions in the vehicle width direction; and a water drain portion which is provided backward of the inner part connection portion in a front-rear direction of the vehicle and drains water toward a side part of the vehicle in the vehicle width direction. The inner part connection portion has a thickness larger than a thickness of the water drain portion.

In the present structure for a front part of a vehicle, the inner part connection portion (the part having the thickness larger than the thickness of the water drain portion) of the cowl member connects, between the corresponding pair of suspension support portions, the inner parts (parts located forward of the rear parts of the each suspension support portions) of the pair of suspension support portions. It is therefore possible to reduce a distance in the front-rear direction of the vehicle from the suspension support portions to a rear end portion of the cowl member (to relieve restrictions on arrangement of the each suspension support portions relative to the vehicle main body) while ensuring rigidity of the vehicle main body. Further, since the inner part connection portion connects the inner parts of the suspension support portions, in the cowl member, a part having a relatively large thickness can be reduced in size in the vehicle width direction as compared with a conventional case where a cowl member connects the rear parts of the pair of suspension support portions. Accordingly, the cowl member can be reduced in weight.

In this case, it is preferable that the cowl member further has a pair of protrusion portions which have respective shapes protruding from end portions of the inner part connection portion in the vehicle width direction, respectively, toward the rear side in the front-rear direction of the vehicle and toward the outer side in the vehicle width direction, and is connected to rear parts of the pair of suspension support portions, respectively, and the pair of protrusion portions has a thickness smaller than a thickness of the inner part connection portion.

In this manner, it is possible to increase connection strength of the cowl member with the each suspension support portions and rigidity of the vehicle main body while avoiding a striking increase in weight of the cowl member.

In the structure for a front part of a vehicle, it is preferable that the water drain portion has a rear connected portion which is portion connected to the vehicle main body, and the rear connected portion has a thickness larger than a thickness of a part other than the rear connected portion of the water drain portion.

In this manner, it is possible to increase connection strength of the cowl member with the vehicle main body while avoiding a striking increase in weight of the cowl member.

Also in the structure for a front part of a vehicle, the thickness of the water drain portion is preferably smaller than the thickness of the pair of protrusion portions.

In this manner, it is possible to suppress deformation of each suspension support portion while maintaining connection strength of the cowl member with the each suspension support portions without applying weight.

The invention claimed is:
1. A structure for a front part of a vehicle, comprising:
a vehicle main body;

a pair of suspension support portions provided to be spaced in a vehicle width direction of the vehicle main body and each supporting a suspension; and a cowl member connected to the pair of suspension support portions, wherein the cowl member has an inner part connection portion which has a shape extending continuously in the vehicle width direction between the pair of suspension support portions and which interconnects respective inner parts of the pair of suspension support portions in the vehicle width direction, and a water drain portion which is provided backward of the inner part connection portion in a front-rear direction of the vehicle and drains water toward a side part of the vehicle in the vehicle width direction, and the inner part connection portion has a thickness larger than a thickness of the water drain portion.

2. The structure for a front part of a vehicle according to claim 1, wherein the cowl member further has a pair of protrusion portions which have respective shapes protruding from end portions of the inner part connection portion in the vehicle width direction, respectively, toward the rear side in the front-rear direction of the vehicle and toward a outer side in the vehicle width direction, the pair of protrusion portions being connected to rear parts of the pair of suspension support portions, respectively, and the pair of protrusion portions has a thickness smaller than a thickness of the inner part connection portion.

3. The structure for a front part of a vehicle according to claim 1, wherein the water drain portion has a rear connected portion which is connected to the vehicle main body, and the rear connected portion has a thickness larger than a thickness of a part other than the rear connected portion of the water drain portion.

4. The structure for a front part of a vehicle according to claim 2, wherein the thickness of the water drain portion is smaller than the thickness of the pair of protrusion portions.

* * * * *